United States Patent
Nishiyama (10) Patent No.: US 9,575,173 B2
(45) Date of Patent: Feb. 21, 2017

(54) IMAGE PROCESSING DEVICE, RADAR APPARATUS, IMAGE PROCESSING METHOD AND IMAGE PROCESSING PROGRAM

(71) Applicant: Furuno Electric Co., Ltd., Nishinomiya (JP)

(72) Inventor: Koji Nishiyama, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 120 days.

(21) Appl. No.: 14/363,760

(22) PCT Filed: Dec. 4, 2012

(86) PCT No.: PCT/JP2012/081339
§ 371 (c)(1),
(2) Date: Jun. 6, 2014

(87) PCT Pub. No.: WO2013/084866
PCT Pub. Date: Jun. 13, 2013

(65) Prior Publication Data
US 2014/0354471 A1 Dec. 4, 2014

(30) Foreign Application Priority Data

Dec. 9, 2011 (JP) ................................ 2011-270151

(51) Int. Cl.
*G01S 13/90* (2006.01)
*G01S 7/12* (2006.01)
(Continued)

(52) U.S. Cl.
CPC ............... *G01S 13/90* (2013.01); *G01S 7/046* (2013.01); *G01S 7/062* (2013.01); *G01S 7/12* (2013.01);
(Continued)

(58) Field of Classification Search
CPC ............. G01S 7/04; G01S 7/062; G01S 7/414
(Continued)

(56) References Cited

U.S. PATENT DOCUMENTS

2006/0132354 A1* 6/2006 Beard .................. G01S 7/2926
342/160
2006/0209061 A1* 9/2006 Burch .................... G06T 13/00
345/419
(Continued)

FOREIGN PATENT DOCUMENTS

GB        2440270 A    1/2008
JP        63126880 U    8/1988
(Continued)

OTHER PUBLICATIONS

European Patent Office, Extended European Search Report Issued in Application No. 12855639.6, Jun. 17, 2015, Germany, 6 pages.
(Continued)

*Primary Examiner* — Peter Bythrow
*Assistant Examiner* — Helena Seraydaryan
(74) *Attorney, Agent, or Firm* — Alleman Hall McCoy Russell & Tuttle LLP (57) ABSTRACT

An image processing device which generates an image where a target object can be discriminated from an object other than the target object. An image processor (15), for echo signals read from a sweep memory (14), calculates a ratio of echo signals indicating a predetermined level or higher among the echo signals of a predetermined number of samples, and generates image data having a display element according to the calculated ratio. This ratio indicates a lower value for an object more isolated and a higher value for an object existing as a larger mass. The image processor (15)acquires color values according to the calculated ratio. Since the target object, such as a ship, is an isolated object
(Continued)

and the ratio becomes low, the color values indicate red, and since inland is an object existing as a large mass and the ratio becomes high, the color values indicate green.

13 Claims, 8 Drawing Sheets

(51) Int. Cl.
 *G01S 7/04* (2006.01)
 *G01S 7/06* (2006.01)
 *G06T 11/00* (2006.01)
 *G01S 13/93* (2006.01)
 *G09G 5/02* (2006.01)

(52) U.S. Cl.
 CPC .......... *G01S 13/9307* (2013.01); *G06T 11/001* (2013.01); *G09G 5/02* (2013.01)

(58) Field of Classification Search
 USPC ........................ 342/90, 91, 93, 94, 160, 161
 See application file for complete search history.

(56) References Cited

U.S. PATENT DOCUMENTS

| | | | |
|---|---|---|---|
| 2008/0030401 A1* | 2/2008 | Kojima | ................... G01S 7/298 342/185 |
| 2011/0063437 A1* | 3/2011 | Watanabe | ............. G01S 7/4802 348/140 |

FOREIGN PATENT DOCUMENTS

| | | |
|---|---|---|
| JP | 140068 Y2 | 12/1989 |
| JP | 2007053439 A | 3/2007 |
| JP | 2010197263 A | 9/2010 |

OTHER PUBLICATIONS

ISA Japanese Patent Office, International Search Report of PCT/JP2012/081339, WIPO, Mar. 5, 2013, 4 pages.

* cited by examiner

IMAGE PROCESSING DEVICE, RADAR APPARATUS, IMAGE PROCESSING METHOD AND IMAGE PROCESSING PROGRAM

TECHNICAL FIELD

The present invention relates to an image generating device, which is inputted with echo signals and generates image data based on the echo signals.

BACKGROUND ART

Conventionally, with radar apparatuses and the like, processing is performed in which a target object is detected based on echo signals and an image display of the echo signals is performed on a display unit (e.g., see Patent Document 1).

As disclosed in Patent Document 1, with the conventional radar apparatuses, the color of the display is different depending on the level of the echo signal.

REFERENCE DOCUMENTS OF CONVENTIONAL ART

Patent Document(s)

Patent Document 1: JP1989-040068Y

DISCLOSURE OF THE INVENTION

Problems to be Solved by the Invention

However, with the method of Patent Document 1, since the same color is displayed if the level of the echo signal is the same, a target object, such as a ship, cannot be discriminated from a large object other than the target object, such as land.

Thus, the present invention aims to provide an image processing device, which generates an image where a target object can be discriminated from an object other than the target object.

SUMMARY OF THE INVENTION

An image processing device of the present invention includes an image data generating module configured to generate image data, and includes a sample data output unit configured to receive echo signals and output data of respective samples obtained by discretizing the echo signals, a target selecting module configured to select, among the samples, samples within a predetermined range, an extracting module configured to extract, among the samples determined by the target selecting module, samples of which data satisfies a predetermined reference value, and a ratio calculating module configured to calculate a ratio of the number of the extracted samples with respect to the number of the samples within the predetermined range. The image data generating module is characterized in determining a display mode of each pixel of the image data based on the ratio, and characterized in receiving the echo signals and generating the image data based on the echo signals.

Since a target object, such as a ship, exists as a single object, unlike an object, such as land, the ratio of the number of the samples indicating a predetermined level or higher among the echo signals becomes relatively low. Therefore, by determining the display mode of each pixel (e.g., the color values of R, G and B) according to this ratio, the image where the target object can be discriminated from an object other than the target object can be generated. The display mode can be set so that the target object can easily be recognized by, for example, as the ratio is lower, setting the color to be red or the like which catches attention, or increasing the luminance value.

Moreover, the target selecting module is preferred to select, among the sample data, the samples within the predetermined range centering on a certain observed sample. Moreover, the ratio calculating module is preferred to calculate the ratio for each sample of the echo signal. In other words, the ratio is calculated about a certain finite range (within a predetermined number of samples) centering on a certain observed sample, and the calculation is performed for all the samples. Such processing can be achieved by a FIR filter, for example.

Moreover, the image data generating module is preferred to determine hue and chroma according to the ratio, determine brightness based on a level of the echo signal, and convert the determined hue, the determined chroma and the determined brightness into the color values.

Human eyes are sensitive to a change of brightness but insensitive to a change of color. Therefore, only hue and chroma are adjusted according to the ratio, and the brightness is set to the value based on the level of the echo signal.

Moreover, the image processing device is preferred to include a low density data generating module configured to generate low density data in which a sample density of the echo signals is reduced, and the ratio calculating module is preferred to calculate the ratio based on the low density data to reduce a processing load.

Moreover, as described above, human eyes are sensitive to a change of brightness but insensitive to a change of color, and therefore, it is preferred that only the hue and the chroma are adjusted according to the ratio calculated based on the low density data, and the brightness is set to a value based on the original data (the level of the echo signal before the reduction). In this case, although the density of the determined hue and the determined chroma are low, the respective values are related to each sample of the original data to determine the hue, the chroma and the brightness of the original data, and the respective values are finally converted into color values of, for example, R, G and B.

Moreover, the extracting module is preferred to reduce the sample number of all the samples within the predetermined range selected by the target selecting module, and extract the samples satisfying the predetermined reference value among the reduced sample. The ratio calculating module is preferred to calculate the ratio by having the number of the reduced samples as the samples within the predetermined range. In other words, the processing load can be reduced by thinning out the number of the samples without changing the target range where the ratio is calculated.

Moreover, the image data generating module is preferred to perform cross-fade processing on the generated image data. Thus, a contour part of, for example, the target object becomes smooth. Especially when the low density data is used, since the density of the hue and the chroma is low, relating the respective values to each sample of the original data leads to the image with emphasized jaggy (aliasing). Thus, it is preferred to make the image smooth by the cross-fade processing.

Effect(s) of the Invention

According to the image processing device of this invention, a target object can be discriminated from an object other than the target object.

MODE(S) FOR CARRYING OUT THE INVENTION

Figure 1A:
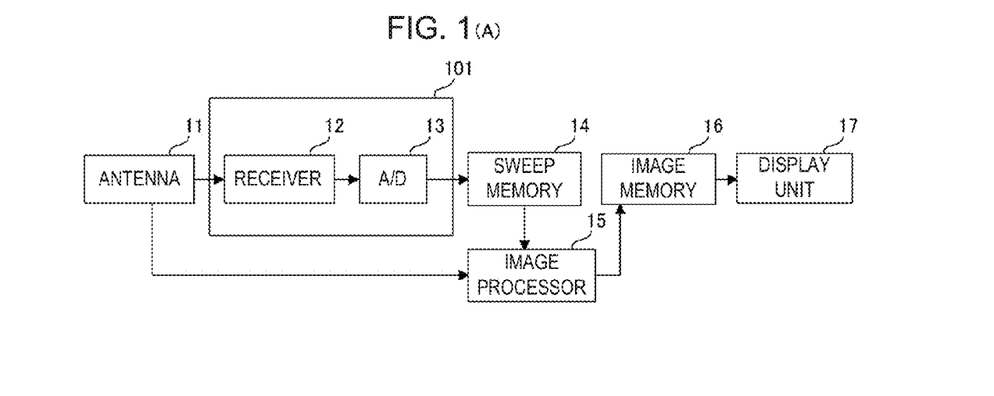
FIG. 1(A) is a block diagram illustrating a configuration of a radar apparatus of this embodiment.

FIG. 1(A) is a block diagram illustrating a configuration of a radar apparatus built therein an image processing device according to the present invention. The radar apparatus is installed in, for example, a ship, and transceives electromagnetic waves around the ship and detects target object(s), such as other ship(s).

In the same drawing, the radar apparatus includes an antenna 11, a sample data output unit 101, a sweep memory 14, an image processor 15, an image memory 16, and a display unit1 17.

The antenna 11 transmits pulsed electromagnetic waves to respective azimuths (every predetermined angle) around the ship and receives echo signals. The sample data output unit 101 includes a receiver 12 and an A/D converter 13. The receiver 12 outputs values corresponding to the levels of the echo signals received by the antenna 11 to the A/D converter 13. The A/D converter 13 converts the inputted echo signals with the analog values into digital values and outputs sample data of the respective discretized samples to the sweep memory 14.

The sweep memory 14 stores the sample data for one measurement cycle (for 360° around the ship). The sample data is stored in association with coordinates (azimuth and distance) of the polar coordinate system.

Figure 2A:
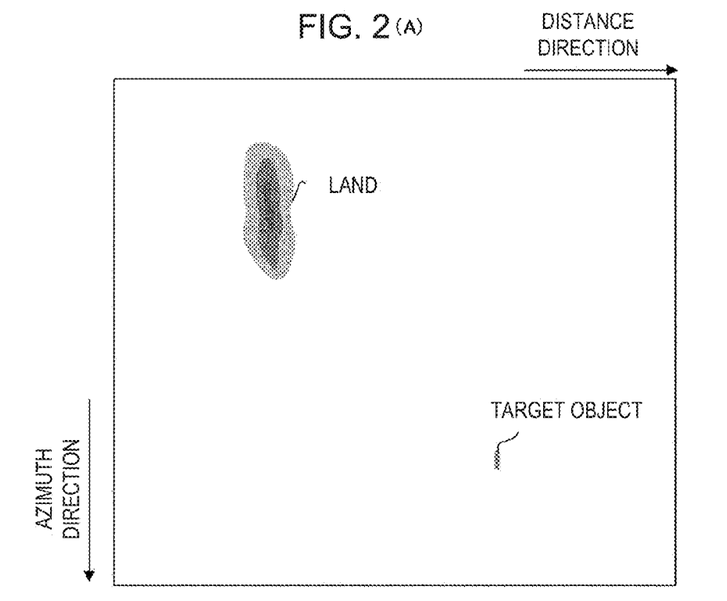
FIG. 2(A) is a view illustrating image data of the polar coordinate system.

The image processor 15, as illustrated in FIG. 2(A), is inputted with the sample data of the polar coordinate system stored in the sweep memory 14 and generates image data having pixel luminance values of gradation corresponding to the levels of the respective samples in the inputted sample data. Moreover, the image processor 15, as illustrated in FIG. 2(B), converts the image data of the polar coordinate system into image data of the orthogonal coordinate system of which origin is a position of the ship, and outputs it to the image memory 16.

Figure 2B:
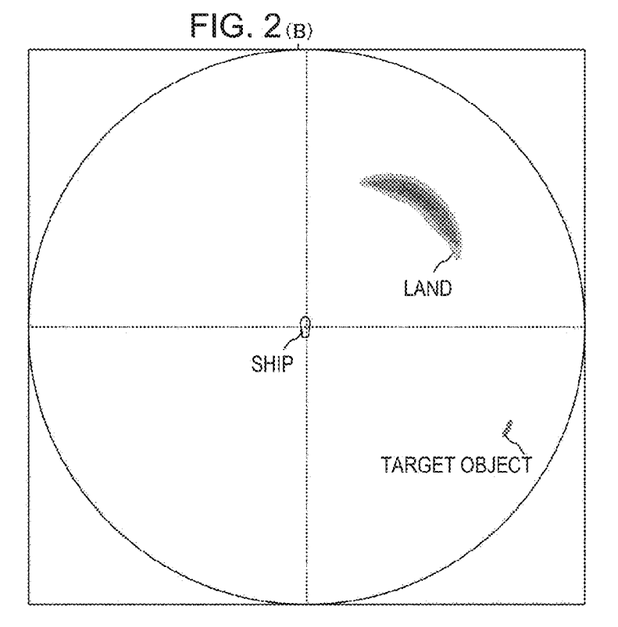
FIG. 2(B) is a view illustrating image data of the orthogonal coordinate system.

On the display unit 17, as illustrated in FIG. 2(B), the image data stored in the image memory 16 is displayed as a radar image (echo image) for a user.

Figure 1B:
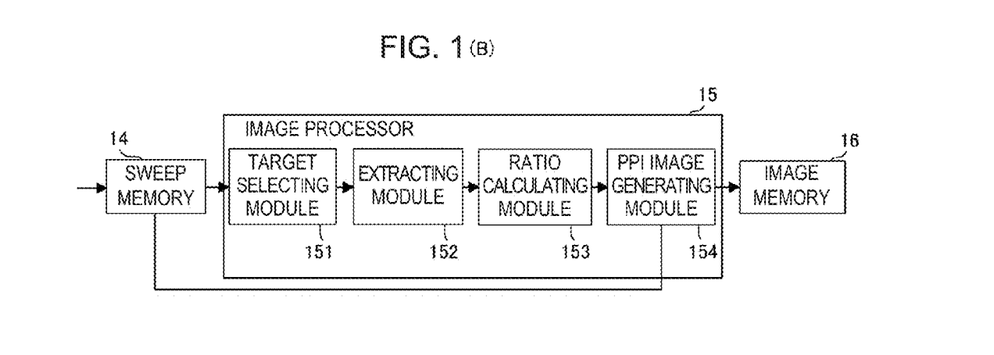
FIG. 1(B) is a block diagram illustrating a functional configuration of an image processor.

The image processor 15, as illustrated in FIG. 1(B), functionally includes a target sample determining module 151 for selecting target samples from the sample data read from the sweep memory 14, an extracting module 152 for extracting, from a predetermined number of the selected samples, the number of the samples indicating levels higher than a predetermined level, a ratio calculating module 153 for calculating a ratio of the number of the extracted samples, and a PPI image generating module 154 for determining a display mode of each pixel of the display according to the calculated ratio and generating image data corresponding to the determined display mode. Although this series of processing is performed on the image data of the polar coordinate system, a mode can also be applied in which it is performed on the image data converted into the orthogonal coordinate system.

Figure 3A:
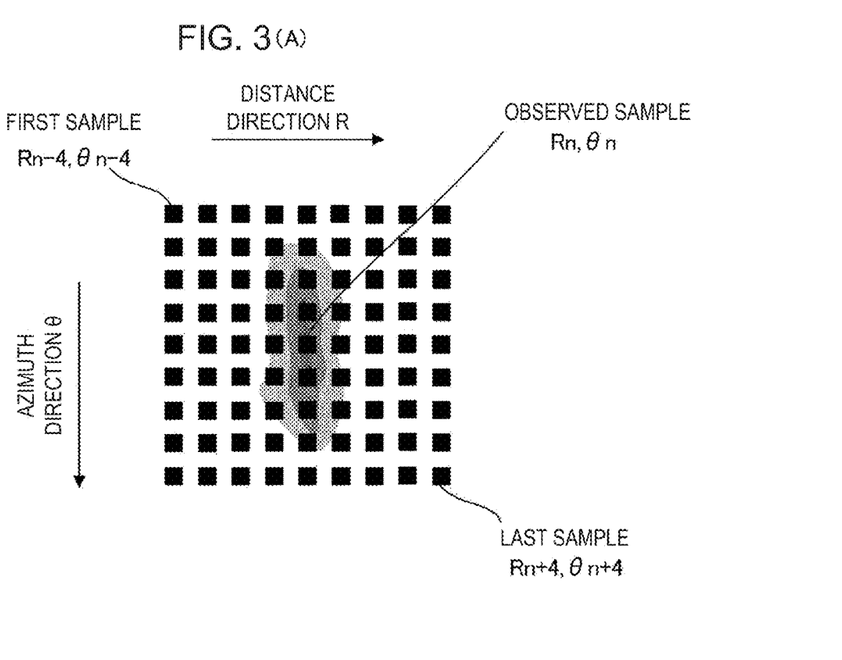
FIG. 3(A) is a view for describing a ratio calculation.

The ratio calculation processing is described with reference to FIG. 3(A). The target sample determining module 151, as illustrated in FIG. 3(A), is inputted with sample data within a predetermined area centering on a certain observed sample (Rn, θn) among the sample data for one measurement cycle which is stored in the sweep memory 14. In FIG. 3(A), an example is illustrated in which a total of eighty-one samples including four previous samples and four following samples of the observed sample (Rn, θn) in an azimuth direction and a distance direction ((Rn−4, θn−4) to (Rn+4, θn+4)) are read.

The extracting module 152 refers to the levels of the sample data in the area and extracts the samples indicating levels higher than the predetermined level as samples that satisfy a predetermined reference value. The predetermined level is set to correspond to, for example, an echo of the sea, which is about the level to be able to be determined that some kind of object exists.

The ratio calculating module 153 divides the number of the extracted samples higher than the predetermined level by the number of all the samples, and calculates the ratio of the number of the extracted samples with respect to the number of the target samples. This calculated ratio becomes a calculation result of the observed sample. This ratio is a lower value as it indicates an object isolated more, such as a ship, and a higher value as it indicates an object existing as a larger mass, such as inland. For example, in the example of FIG. 2(A), the samples corresponding to the target object indicate a low value and, among the samples corresponding to land, the samples corresponding to a contour between land and the sea (i.e., shore side) indicate a high value and further indicate an even higher value as it goes further inland.

The image processor 15 calculates the ratio as above for all the samples. Since such processing corresponds to calculation processing of movement, it is achieved by an FIR filter.

Note that, in FIG. 3(A), the example in which the calculation of a two-dimensional area is performed is illustrated; however, the calculation of a single-dimensional area, such as only the azimuth direction or the distance direction, may be performed.

Figure 3B:
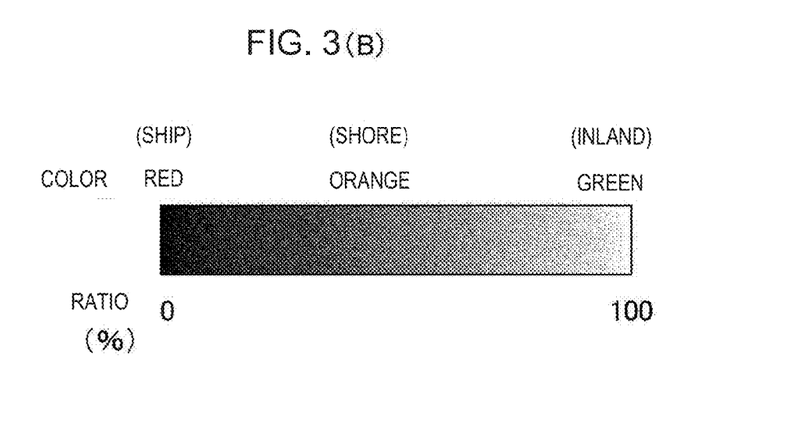
FIG. 3(B) is a view for describing a color map.

The PPI image generating module 154 determines how to display each display element, which corresponds to one pixel of the image data, based on each ratio calculated as described above. That is, the PPI image generating module 154 acquires color values (values of R, G and B) from a color map as illustrated in FIG. 3(B) according to the calculated ratio. As the ratio is lower, the contents of the color map of this example indicate red, which easily catches people's attention, and as the ratio is higher, the contents of the color map indicate green, which is close to the color of land in a satellite photo. Since the target object, such as a ship, is an isolated object and the ratio will be low, the color values indicate red, and since land is an object existing as a large mass and the ratio will be high, the color values indicate green. At the seashore, since an area where the level is below the predetermined level, such as the sea, and a landmass are mixed, the color values indicate orange which is a neutral color. Note that the color map associated with the ratio is not limited to this example.

The PPI image generating module 154 determines the color values of each pixel as described above and generates the image data. Note that, the color values indicate the luminance values (R, G and B) of the respective primary colors, and the final luminance values of each pixel are adjusted based on the echo levels. In other word, even if the determined color values are the same color values, each of the luminance values of R, G and B becomes higher for the pixel with higher levels of the echo signals, and each of the luminance values of R, G and B becomes lower for the pixel with lower levels of the echo signals. Therefore, even between target objects having substantially the same weight, the target object with a large reflection area and of which the levels of the echo signals are high becomes light red, and the target object with a small reflection area and of which the levels of the echo signals are low becomes dark red.

Figure 4:
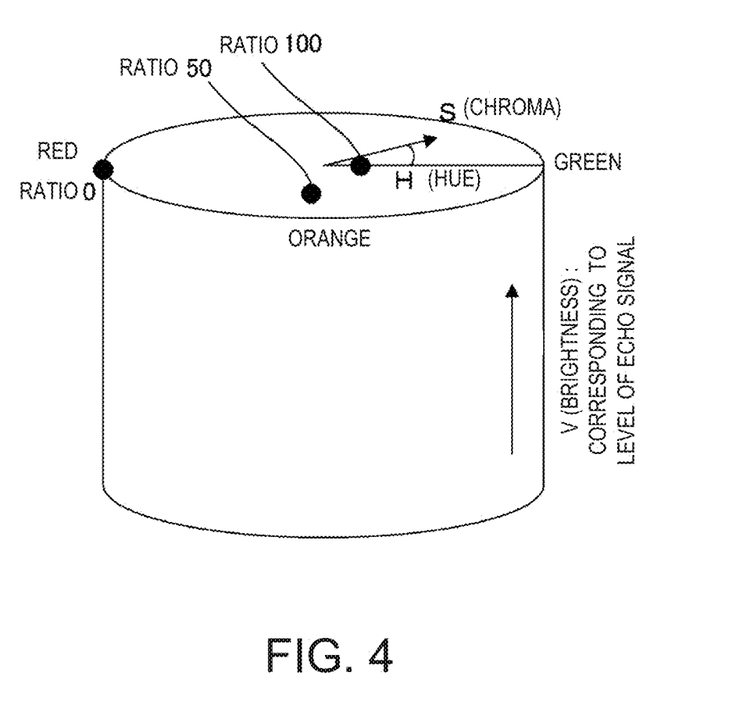
FIG. 4 is a view illustrating an example in a case of relating to the HSV color space.

Moreover, the PPI image generating module 154, as illustrated in FIG. 4, determines hue and chroma according to the ratio in relation to the color map of the HSV color space model, and as for brightness, it is preferred to set it to a value based on the level of the echo signal. Human eyes are sensitive to a change in brightness but insensitive to a change in hue. Therefore, only the hue and chroma are adjusted according to the ratio, and the brightness is set to the value based on the level of the echo signal. In this case, the PPI image generating module 154 converts the determined hue, chroma and brightness into values of R, G and B by using a conversion equation.

As above, by generating the image data having the display elements according to the ratio showing how much the target object is isolated, an image where the target object can be discriminated from objects other than the target object can be generated. For example, as the ratio is lower, by using more distinctive color, such as red, the user can instinctively recognize that the red echo image indicates the target object, such as a ship.

Note that, the part where neither the target object nor land exists, in other words, the sea part indicating a level lower than the predetermined level, may be in a state with no color (black or white); however, it is desirable to be in a display mode where it is entirely blue so as to be close to a status in which the user is actually looking at the sea. Note that, there is a case where the color of the contour part between the sea part and either one of the target object and the shore side sharply changes from the color of the sea to red or orange and the image becomes rough with the contour emphasized. Thus, the PPI image generating module 154 is preferred to perform cross-fade processing so that the influence of blue gradually subsides as the level of the echo signal of each pixel is away from the predetermined level (level corresponding to the echo of the sea). Thus, the image with a gentle contour can be displayed.

Next, a reduction of a processing load in calculating the ratio is described with reference to FIG. 5. Since the calculation processing of the ratio is the calculation processing of movement as described above, it is processing which causes a high load among general image processing. Therefore, reducing the load of this ratio calculation processing is an important factor in displaying the image in real time.

Figure 5:
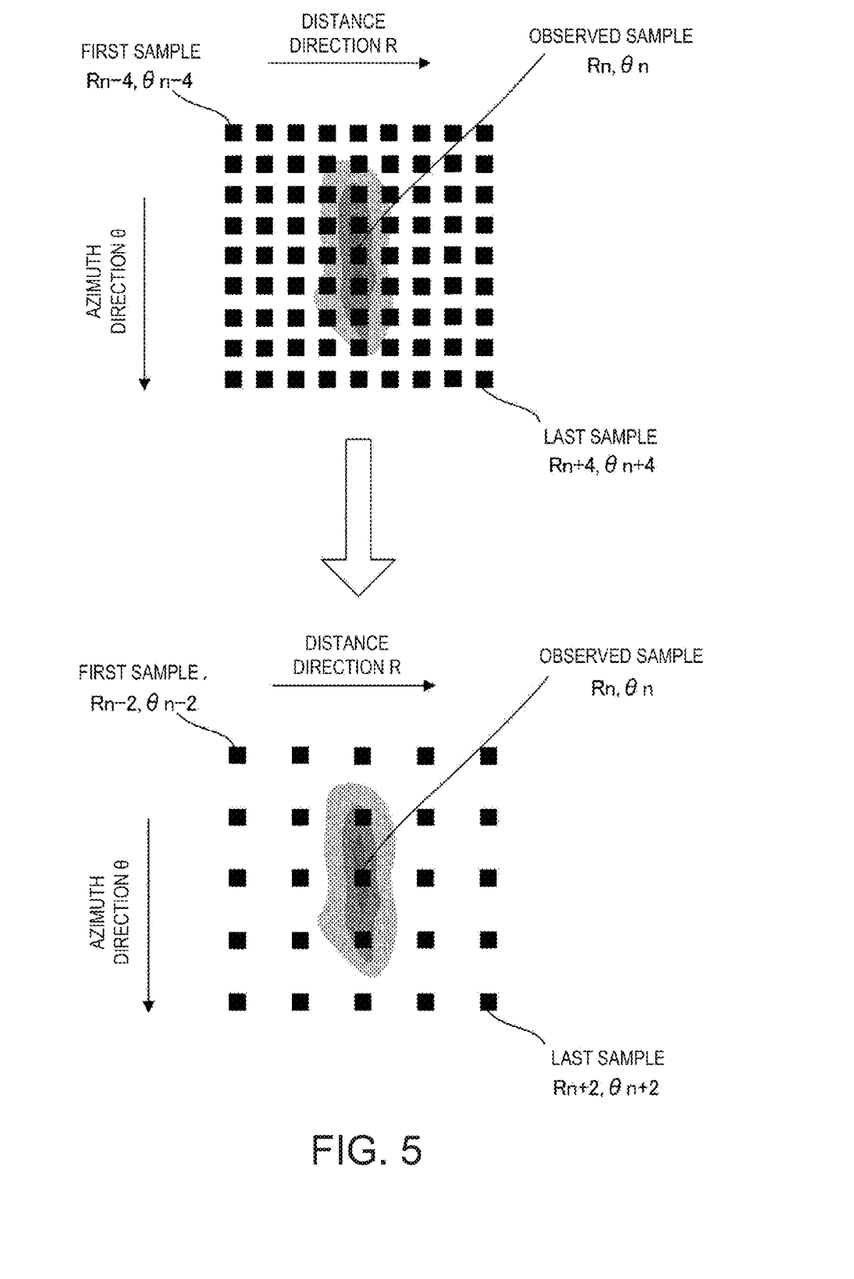
FIG. 5 shows views for describing an example when the number of samples used for the ratio calculation is reduced.

FIG. 5 shows views for describing an example when the number of samples used for the ratio calculation is reduced. The extracting module 152 and the ratio calculating module 153 reduce the number of the samples from the total number of the samples within the predetermined area. For example, as illustrated in FIG. 5, the processing of setting the samples within the predetermined area to be the total of eighty-one samples including the four previous samples and the four following samples of the observed sample (Rn, θn) in the azimuth direction and the distance direction ((Rn+4, θn+4) to (Rn+4, θn+4)) may be changed to processing of setting them to be a total of twenty-five samples including two of every other previous samples and two of every other following samples of the observed sample (Rn, θn) in the azimuth direction and the distance direction ((Rn+4, θn+4) to (Rn−4, θn−4)). That is, by thinning out the number of the samples without changing the target area for which the ratio is calculated, the processing load is reduced. As described above, regarding the change of color, since human eyes are insensitive to the change in hue, a substantially similar effect can be obtained from the ratio for calculating the color values even when the number of the samples is reduced.

Figure 6:
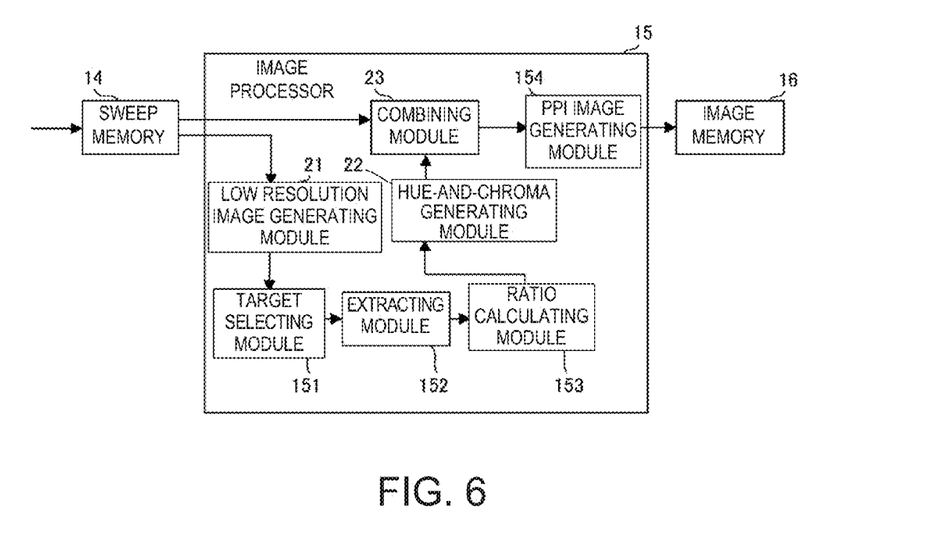
FIG. 6 is a block diagram illustrating a functional configuration of the image processor.
Figure 7:
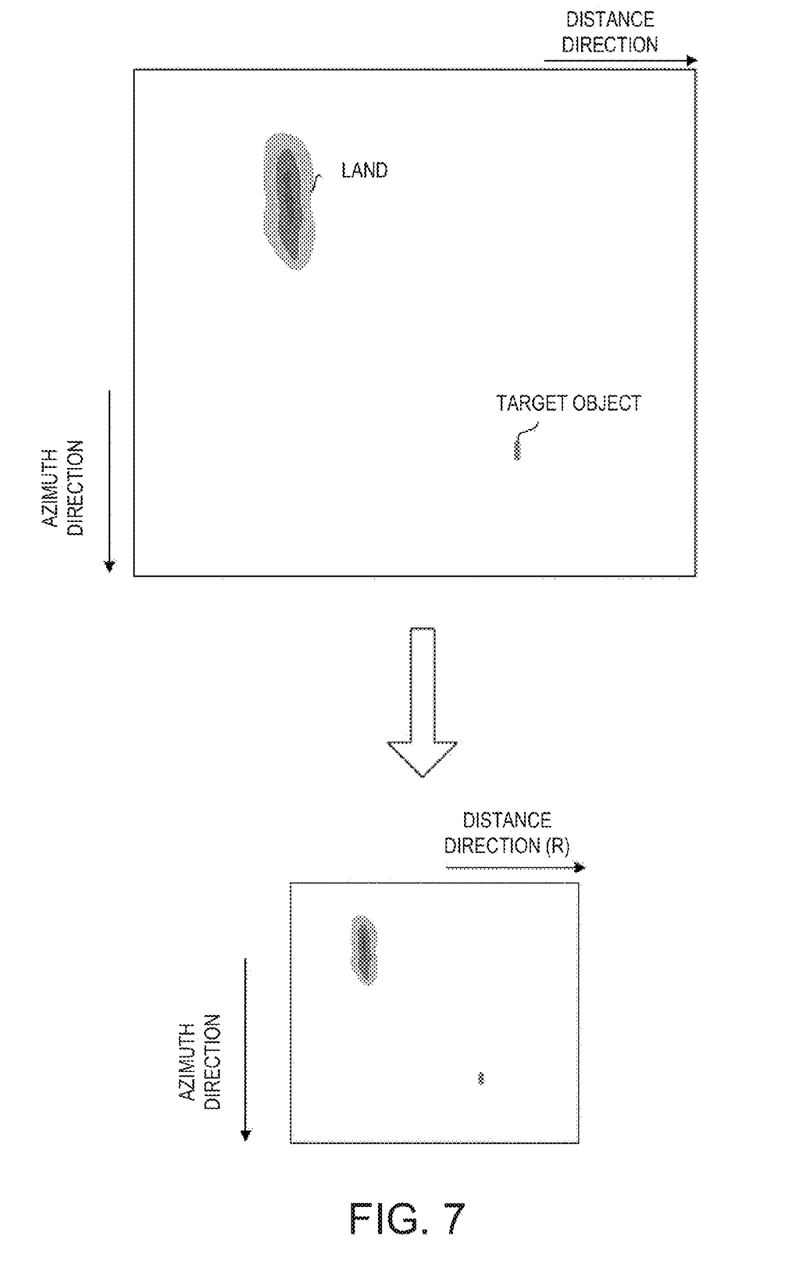
FIG. 7 shows views for describing a low-resolution image.

Next, an example in which the color values are calculated by using low-density data (low resolution image) of which a sampling density of the echo signal is reduced, is described with reference to FIGS. 6 and 7. FIG. 6 is a block diagram illustrating a functional configuration of the image processor 15. The common configuration with that in FIG. 1(B) is denoted with the same reference numerals and the description thereof is omitted. The image processor 15 also includes a low resolution image generating module 21, a hue-and-chroma generating module 22, and a combining module 23.

The low resolution image generating module 21 reads the echo signals for one measurement cycle stored in the sweep memory 14, and performs down-sampling. That is, as illustrated in FIG. 7, low resolution image data with lower resolution than the image data generated based on the original echo signals is generated (in this example, the image data with one-fourth the number of pixels is generated).

The ratio calculating module 153 uses this low resolution image data to calculate the ratio. The hue-and-chroma generating module 22 determines the hue and the chroma according to the ratio calculated by using the low density image data.

The combining module 23 reads the echo signals from the sweep memory 14 and determines the values of R, G and B for each sample. Here, since the hue and the chroma are generated by using the low resolution image data, the combining module 23 relates the hue and the chroma of each pixel to each pixel of the original data (high resolution image data) to determine the hue, the chroma and the brightness of each pixel of the original data. Then, the combining module 23 finally converts the determined hue, chroma and brightness into the color values of R, G and B. Thus, the image data of the polar coordinate system is generated.

Finally, the PPI image generating module 154 converts the image data of the polar coordinate system generated by the combining module 23 into the image data of the orthogonal coordinate system and outputs it to the image memory 16.

As described above, since human eyes are sensitive to the change in brightness and insensitive to the change in hue, by adjusting only the hue and the chroma according to the ratio calculated based on the low resolution image data, and setting the brightness to the value based on the original data (high resolution image data), the substantially similar effect to the case where the hue and the chroma are determined based on the original data can be obtained.

Note that, relating the hue and the chroma of each pixel calculated based on the low resolution image data to each pixel of the original data (high resolution image data) leads to the image with emphasized jaggy (aliasing). Thus, the combining module 23 is preferred to perform the cross-fade processing to create a smother image.

Figure 8:
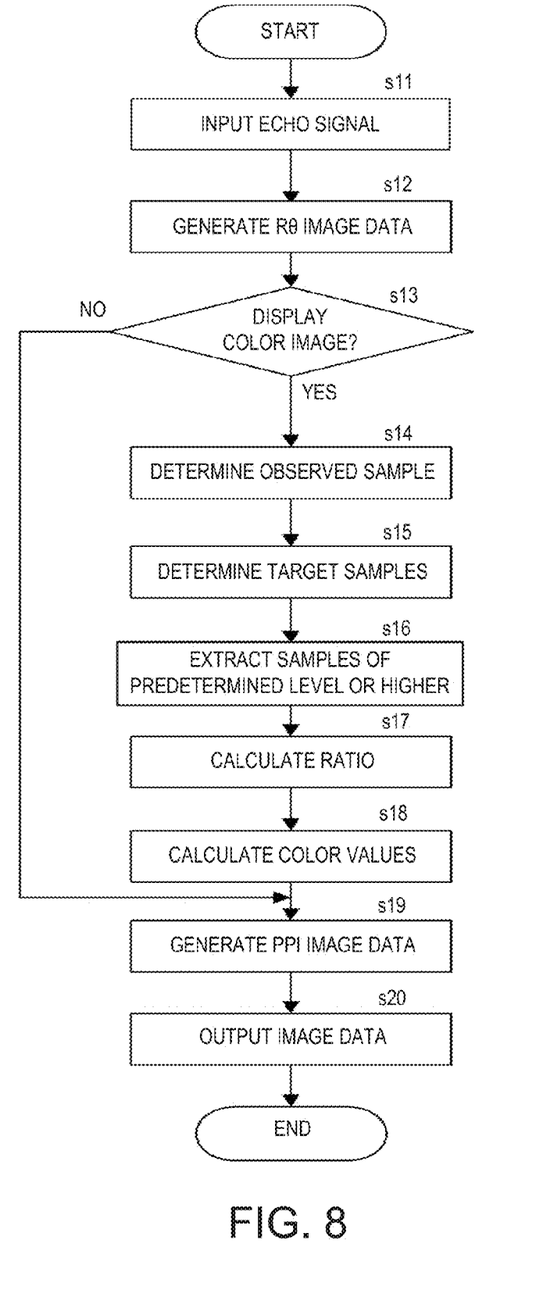
FIG. 8 is a flowchart illustrating operation of an image processing device.

Next, the operation of the image processor 15 is described with reference to FIG. 8. In the image processor 15, the PPI image generating module 154 is first inputted with the echo signal from the sweep memory 14 (S11), and generates the image data having the pixel luminance values of the gradation corresponding to the levels of the respective samples (S12). In a case not displaying a color image (displaying a gray scale image) (S13: NO), the PPI image generating module 154 converts the generated image data of the polar coordinate system into the image data of the orthogonal coordinate system (S19) and outputs the image data (S20).

In a case of displaying the color image (S13: YES), the target selecting module 151 of the image processor 15, as illustrated in FIG. 3(A), determines the observed sample (S14) and determines the target samples (S15). For example, as illustrated in the example of FIG. 3(A), the target selecting module 151 reads, among the sample data for one measurement cycle stored in the sweep memory 14, the total of eighty-one samples including the four previous samples and the four following samples of the certain observed sample (Rn, θn) in the azimuth direction and the distance direction ((Rn−4, θn−4) to (Rn+4, θn+4)). Then the extracting module 152 extracts the samples indicating the levels higher than the predetermined level as the samples that satisfy the predetermined reference value (S16). Then the ratio calculating module 153 calculates the ratio by calculating the ratio of the number of the extracted samples with respect to the number of the target samples (S17). This ratio calculation processing may be performed about all the sample data within the predetermined area or may be performed by reducing the number of the samples as illustrated in FIG. 5. Moreover, as illustrated in FIGS. 6 and 7, when calculating the ratio based on the low resolution image data, the low resolution image data is generated in the processing at S12, and the ratio is calculated by using the low resolution image data in the processing at S16 and S17.

Then, the PPI image generating module 154 calculates the color values according to the calculated ratio (S18). That is, the PPI image generating module 154 refers to the color table illustrated in FIG. 3(B) with the calculated ratio, and calculates the color values. In this case, the final luminance is adjusted according to the levels of the respective samples. Alternatively, the PPI image generating module 154 determines the hue and the chroma within the HSV color space illustrated in FIG. 4, determines the brightness to be the value based on the levels of the respective samples, and coverts them into the color values. Note that, when performing the cross-fade processing, it is performed after this processing at S18.

Then, the PPI image generating module 154 finally determines the luminance values of R, G and B of each pixel of the image data based on the determined color values, and converts them into the image data of the orthogonal coordinate system (S19). The image data of the orthogonal coordinate system generated as described above is outputted to the image memory 16 (S20), and is displayed as an image on the display unit 17.

Note that, the example in which the image processing device of this embodiment is installed in a radar apparatus is described; however, not limited to the example of being installed in the radar apparatus, an example of being installed in an information processing device, such as a personal computer, is also applicable, or it may also be achieved as a program which is executed by an information processing device.

Moreover, in this embodiment, the example in which the samples indicating the levels higher than the predetermined level are determined as the samples that satisfy the reference value is described; however, in a case of detecting a Doppler speed, the samples indicating a Doppler speed higher than a predetermined speed can be determined as the samples that satisfy the reference value. In this case, the image processor 15 extracts the number of the samples indicating the Doppler speed higher than the predetermined speed from the target samples, calculates the ratio of the number of the extracted samples, determines the display mode of each pixel according to the calculated ratio, and generates the image data corresponding to the determined display mode. Moreover, by extracting the number of the samples indicating the levels higher than the predetermined level, determining the display mode according to the ratio of the number of the extracted samples, further extracting the number of the samples indicating the speed higher than the predetermined speed, and determining the display mode according to the ratio of the extracted samples, the target object(s) can be discriminated from other object, and among the target objects, a moving body (e.g., a ship) can also be discriminated from a fixed object (e.g., a buoy).

DESCRIPTION OF REFERENCE CHARACTERS

11 Antenna
12 Receiver
13 A/D converter
14 Sweep memory
15 Image processor
16 Image memory
17 Display unit
151 Target sample determining module
152 Extracting module
153 Ratio calculating module
154 PPI image generating module
21 Low resolution image generating module
22 Hue-and-chroma generating module
23 Combining module

The invention claimed is:
1. An image processing device including an image data generating module configured to generate image data, comprising:
   a sample data output unit configured to receive echo signals and output data of respective samples obtained by discretizing the echo signals;
   a target selecting module configured to select, among the samples, samples within a predetermined range in a sample area;
   an extracting module configured to extract, among the samples determined by the target selecting module, samples that satisfy a predetermined reference value; and a ratio calculating module configured to calculate a ratio of the number of the extracted samples with respect to the number of the samples within the predetermined range, wherein the predetermined range is a range in an azimuth direction and/or a distance direction, satisfying the predetermined reference value corresponds to having a value higher than the echo signals resulting from background noise, the image data comprises a plurality of pixels, and the image data generating module determines one of three or more display modes for each pixel of the image data based on the ratio and the predetermined reference value.

2. The image processing device of claim 1, wherein the target selecting module selects, among the sample data, the samples within the predetermined range centering on a certain observed sample.

3. The image processing device of claim 1, wherein the ratio calculating module calculates the ratio for all samples of the echo signal.

4. The image processing device of claim 1, wherein the image data generating module generates the image data having color values according to the ratio.

5. The image processing device of claim 4, wherein the image data generating module determines hue and chroma according to the ratio, determines brightness based on a level of the echo signal, and converts the determined hue, the determined chroma and the determined brightness into the color values.

6. The image processing device of claim 1, further comprising a low density data generating module configured to generate low density data in which a sample density of the echo signals is reduced, and wherein the ratio calculating module calculates the ratio based on the low density data.

7. The image processing device of claim 5, further comprising a low density data generating module configured to generate low density data in which a sample density of the echo signals is reduced, wherein the ratio calculating module calculates the ratio based on the low density data, wherein the image data generating module determines the hue and the chroma according to the ratio calculated based on the low density data, and determines the brightness based on the level of the inputted echo signal, and wherein the image data generating module relates the determined hue and the determined chroma to the respective samples of the echo signals before a reduction, and converts the hue, chroma and brightness into the color values.

8. The image processing device of claim 1, wherein the extracting module reduces the sample number of all the samples within the predetermined range selected by the target selecting module, and extracts the samples satisfying the predetermined reference value among the reduced samples, and wherein the ratio calculating module calculates the ratio by having the number of the reduced samples as the samples within the predetermined range.

9. The image processing device of claim 1, wherein the image data generating module performs cross-fade processing to smooth the image data.

10. The image processing device of claim 1, further comprising a Doppler speed detecting module configured to detect a Doppler speed of each sample, wherein the extracting module extracts a sample of which Doppler speed is a predetermined speed or higher, as the sample satisfying the predetermined reference value.

11. A radar apparatus, comprising:

the image processing device of claim 1;

a transceiver configured to discharge electromagnetic waves around the radar apparatus, receive the echo signals reflected on respective target objects, and input them to the sample data output unit; and a display unit configured to display an image including the target objects based on the image data generated by the image data generating module.

12. An image processing method for generating image data implemented at least in part on a display device, comprising:

receiving, with a receiver, echo signals with analog values, corresponding to an image pixel, from an antenna;

converting the received echo signals into discretized echo signals, corresponding to the image pixel, with digital values via an A/D converter;

outputting the discretized echo signals into memory;

causing a processor of the display device to:

select, among the discretized echo signals, discretized echo signals within a predetermined range in a sample area, the predetermined range being a range in an azimuth direction and/or a distance direction;

extract, among the discretized echo signals within the predetermined range, discretized echo signals that satisfy a predetermined reference value, wherein satisfying the predetermined reference value corresponds to having a value higher than the echo signals resulting from background noise;

calculate a ratio of the number of the extracted discretized echo signals with respect to the number of the discretized echo signals within the predetermined range, and determine one of three or more display modes for each pixel of the image data based on the ratio for image data comprising a plurality of pixels, and displaying the image data on a display of the display device.

13. An image processing program, stored on a non-transitory computer readable medium, implemented by an image processing device, the program executed at least in part by a processor of the image processing device to cause the image processing device to execute an image data generating step, comprising:

a sample data output step of receiving echo signals from an antenna with a receiver, converting the received echo signals into discretized echo signals with an A/D converter, and outputting data of respective discretized echo signals into memory;

a target selecting step of selecting, among the discretized echo signals, discretized echo signals within a predetermined range in a sample area with the processor;

an extracting step of extracting, among the discretized echo signals selected by the target selecting step, discretized echo signals that satisfy a predetermined reference value with the processor;

a ratio calculating step of calculating a ratio of the number of the extracted discretized echo signals with respect to the number of the discretized echo signals within the predetermined range with the processor, wherein the image data generating step includes determining one of three or more display modes for each pixel of the image data based on the ratio for image data comprising a plurality of pixels, the predetermined range is a range in an azimuth direction and/or a distance direction, satisfying the predetermined reference value corresponds to having a value higher than the echo signals resulting from background noise, and displaying the image data on a display device.

* * * * *

UNITED STATES PATENT AND TRADEMARK OFFICE
CERTIFICATE OF CORRECTION

| | | |
|---|---|---|
| PATENT NO. | : 9,575,173 B2 | Page 1 of 1 |
| APPLICATION NO. | : 14/363760 | |
| DATED | : February 28, 2017 | |
| INVENTOR(S) | : Koji Nishiyama | |

It is certified that error appears in the above-identified patent and that said Letters Patent is hereby corrected as shown below:

On the Title Page

In item (57), abstract:

On Line 3, delete "(15)" and;

On Line 4, delete "(14)" and;

On Line 5, delete "of echo signals" and;

On Line 7, insert --that varies-- after 'element' and;

On Line 9, delete "an object" and insert --objects-- and;

On Line 9, insert --, such as a ship,-- after 'isolated' and;

On Line 9 - 10, delete "an object existing as a" and insert --objects that have-- and;

On Line 10, insert --, such as land-- after 'mass' and;

On Line 11, delete "(15)".

Signed and Sealed this
Twenty-fifth Day of April, 2017

Michelle K. Lee
*Director of the United States Patent and Trademark Office*